April 3, 1956 S. LONDON ET AL 2,740,931
INSTANTLY SWITCHING REVERSIBLE MOTOR
Filed Jan. 18, 1954
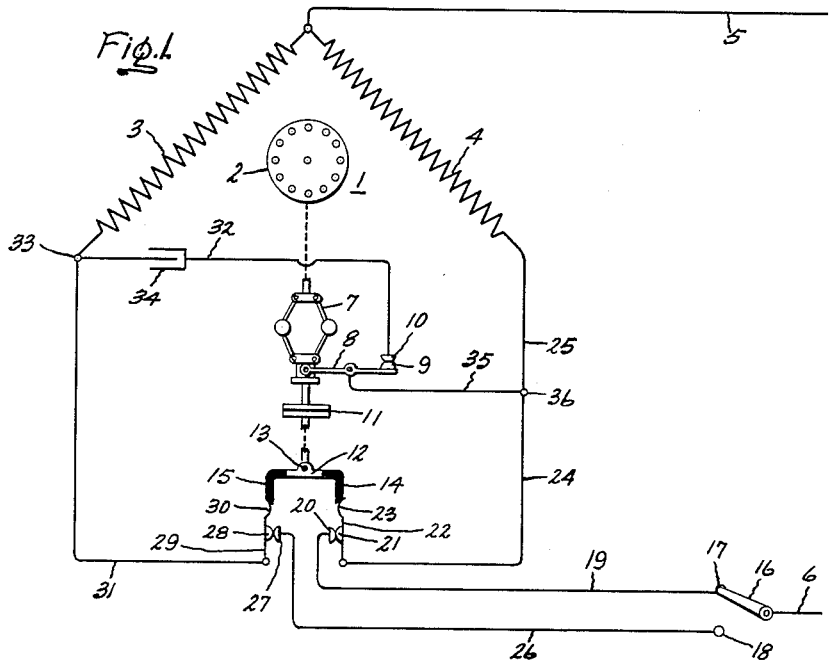
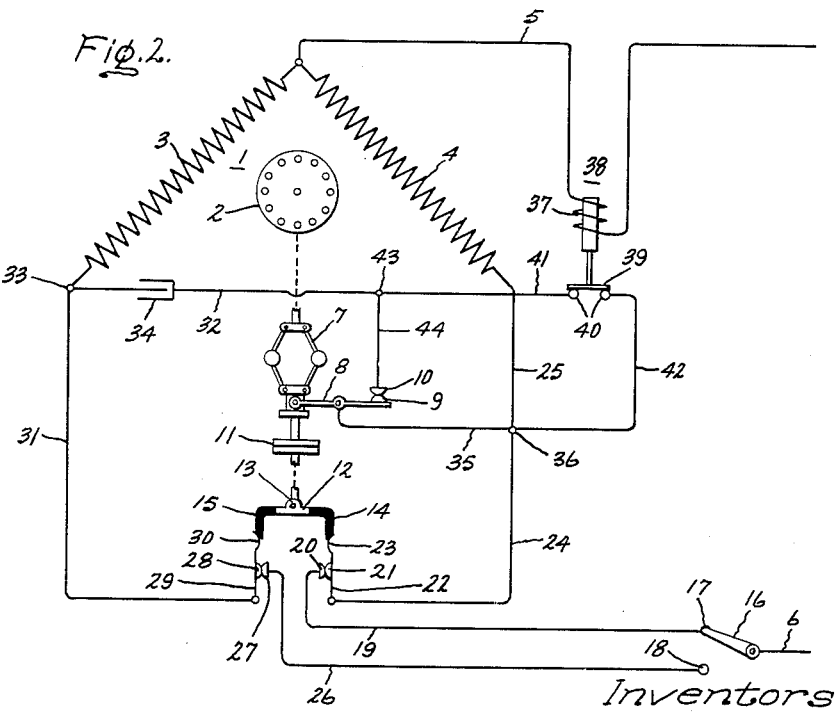
Inventors:
Sol London,
Richard D. Kirk,
by [signature]
Their Attorney.

United States Patent Office 2,740,931
Patented Apr. 3, 1956

2,740,931

INSTANTLY SWITCHING REVERSIBLE MOTOR

Sol London, Fort Wayne, Ind., and Richard D. Kirk, Weymouth Heights, Mass., assignors to General Electric Company, a corporation of New York Application January 18, 1954, Serial No. 404,711

4 Claims. (Cl. 318—203)

This invention relates to electric motors and more particularly to an improved reversing circuit for single phase alternating current motors.

There are many applications for reversible single phase alternating current motors, and many different reversing circuits have been used with varying degrees of success. Experience has shown that there are several features in such circuits which rise in importance above all others in making such circuits economical and practical. One of these involves the number of external leads. When the control device for a reversing circuit is to be at a distance from the motor, it is requisite that the number of leads to the control device be kept to a minimum for reasons of space and cost. Another important feature involves the fact that in many circuits heretofore devised, it is has not been possible to instantly switch from one connection to the other to reverse the motor; instead, a certain amount of delay has been necessary to give the starting winding circuit time to close since, otherwise, reconnection of only one winding would not reverse the direction of rotation of the motor. This is particularly inconvenient where the control involves relays which have an extremely short time of switching action. Consequently, it is highly desirable to effect a circuit wherein the switching may be instantaneous and reversal of the motor will still be insured. Another consideration is the switching means itself; since cost increases with complexity, the most desirable circuits will be those which require the simplest switch.

An object of this invention is, therefore, to provide a reversing circuit for a single phase alternating current motor which will incorporate the desirable features set forth above.

Further objects and advantages of this invention will become apparent and the invention will be better understood by reference to the following description and the accompanying drawing; and the features of novelty which characterize this invention will be pointed out with particularity in the claims annexed to and forming a part of this specification.

This invention in its broadest aspects provides a reversing circuit for a single phase alternating current motor, the motor having two windings each being capable of use as either a starting winding or a main winding. Phase displacing means are provided which may be put in series with either winding so that a rotating field will be provided for starting the motor. The phase displacing means is always in series with a speed responsive switch which opens at a predetermined speed to permit the motor to run on the main winding alone. Speed and direction responsive means are provided so that when the motor reaches a certain speed in one direction the circuits which would cause it to run in the opposite direction will be disconnected in addition to the disconnection by the external switch. By this means the motor may be instantly switched without fear that reversal will not occur. This results from the fact that the speed and direction responsive means have opened the reversing circuits so that upon throwing the switch neither winding will receive any current until the speed responsive switch has closed and the speed and direction responsive means have reconnected the circuits. At this time both windings will receive current in such a manner as to effect reversal of the motor.

In the drawing, Fig. 1 is a schematic diagram of one embodiment of the improved reversing circuit of this invention; and Fig. 2 schematically shows a second embodiment of the improved reversing circuit of the invention.

Referring now to Fig. 1 of the drawing, there is shown a single phase alternating current motor 1, for example an induction motor, having a squirrel cage rotor 2 with a pair of windings 3 and 4 each having an end connected to a common terminal 45. Energization for the motor is provided by an external source of alternating current (not shown) through lines 5 and 6.

A centrifugal mechanism 7 is secured by any convenient means to rotor 2 and a movable element 8 having a contact 9 at its end is caused by centrifugal mechanism 7 to separate from contact 10 at a predetermined speed. A friction device 11 is operated by rotor 2 to cause a member 12 to pivot about a point 13. Member 12 is biased to the horizontal position shown, and the direction of pivoting is determined by the direction of rotation of rotor 2. Ends 14 and 15 of member 12 are insulated for a purpose to be described below. A single-pole double-throw switch 16 is adapted to connect line 6 with either terminal 17 or terminal 18. Terminal 17 is connected by line 19 to contact 20. A contact 21 is carried on an arm 22 and is normally in engagement with contact 20. However, when member 12 is caused to pivot clockwise, insulated end 14 will descend to force arm 22 outwardly by pushing against curved portion 23 of arm 22, thereby separating contact 21 and contact 20. Lines 24 and 25 connect contact 21 with winding 4.

Starting now from terminal 18, this terminal is connected by a line 26 to a contact 27. Contact 27 is normally in engagement with a contact 28 carried by an arm 29 which has a curved portion 30 similar to curved portion 23 of arm 22. When member 12 is pivoted counterclockwise, end 15 of member 12 descends to hit curved portion 30 of arm 29 and force contact 28 away from contact 27. Contact 28 is connected to winding 3 by line 31. Referring now to the centrifugally activated contacts, contact 10 is connected by a line 32 to a point 33 which forms a junction between line 31 and winding 3. A phase displacing device, such as condenser 34, is placed in line 32. Contact 9 communicates by means of conducting arm 8 with a line 35 which connects contact 9 to a point 36 which forms the junction of lines 24 and 25.

The operation of the reversing circuit of Fig. 1 will now be described. Assuming that switch arm 16 is in the position shown, connecting line 6 to terminal 17, a circuit will be completed through line 19, contacts 20 and 21, line 24, line 25, and winding 4 to line 5. A second circuit will be also completed which coincides with the first circuit as far as point 36. From point 36 the second circuit goes through line 35, element 8, contacts 9 and 10, line 32, condenser 34, and winding 3 to line 5. It will be seen that the condenser 34 provides a phase displacement between windings 3 and 4, and motor 1 is started in the selected direction of rotation.

At a predetermined speed of rotor 2 the direction and speed sensitive member 12 will be pivoted counter-clockwise to separate contacts 27 and 28. No circuit is completed through these contacts at this time and therefore there is no immediate result from the separation of contacts 27 and 28. At a higher predetermined speed centrifugal mechanism 7 will cause element 8 to move down separating contacts 9 and 10. This causes disconnection of the circuit to winding 3, and motor 1 will henceforth run on winding 4 alone. If it is wished to reverse the direction of rotation of motor 1, switch arm 16 is moved to terminal 18 as rapidly as desired. Since contacts 27 and 28 are separated, no circuit whatsoever will be completed and motor 1 will slow down. At its predetermined speed centrifugal mechanism 7 will permit contact 9 to again engage contact 10 as motor 1 slows down. Contacts 27 and 28 are still separated so that no circuit is completed through either winding. After the motor slows down for an additional period of time member 12 will be biased back to its horizontal position. This will permit contacts 27 and 28 to close and circuits will be completed through the two windings as follows: From terminal 18 through line 26, contacts 27 and 28, line 31, and winding 3 to line 5; and from terminal 18 through line 26, contacts 27 and 28, line 31, line 32 and condenser 34, contacts 10 and 9, element 8, line 35, line 25, and winding 4 to line 5. As the motor comes up to speed after reversal, first the member 12 will be pivoted clockwise to open contacts 20 and 21 (without an immediate result) and then centrifugal mechanism 7 will cause contacts 9 and 10 to separate. This latter separation will open the circuit to winding 4 and the motor will run in opposite rotation on winding 3 alone.

It is desirable to have member 12 actuated at a lower speed than centrifugally actuated element 8, since if member 12 returns to its biased position before contacts 9 and 10 are in engagement a circuit will be completed through only one winding and the motor will then speed up again without reversing. It will be seen that no matter how fast switch arm 16 is moved from one of the terminals 17 or 18 to the other a reversing action will be effected because neither winding will have a completed circuit until it is insured that both windings have a completed circuit.

Referring now to Fig. 2 of the drawing in which like numerals are used to indicate like parts, it will be noticed that in this embodiment line 5 contains a coil 37 of a relay 38 which actuates a member 39 adapted to bridge contacts 40 thereby to connect a line 41 to a line 42. When current energizes coil 37 member 39 will be raised so that no circuit is completed across contacts 40; when no current flows in line 5 member 39 will descend to bridge contacts 40 and connect line 41 and 42. Line 41 is connected by a point 43 to line 32 and to line 44 which terminates in contact 10.

The operation of this embodiment will now be described. When switch arm 16 connects line 6 to terminal 17 the circuits through windings 4 and 3 are completed in precisely the same manner as before. By the same token, contacts 27 and 28 will be opened as before and contacts 9 and 10 will similarly open to cause motor 1 to run on winding 4 alone. As long as either or both of windings 3 and 4 are energized current flows in line 5 and relay 38 is energized so that member 39 is raised and no circuit is completed across contacts 40. When switch 16 is moved to terminal 18 to reverse the motor the separation of contacts 27 and 28 prevents the energization either of windings 3 or 4. Consequently no current will flow in line 5 and relay 38 will be de-energized. This causes member 39 to bridge contacts 40 and a closed dynamic breaking circuit is established as follows: Starting at point 33, through winding 3, winding 4, line 25, line 42, bridged gap 40, line 41, line 32, condenser 34, and back to point 33. This will cause the motor to brake extremely rapidly and quickly slow down to speeds where member 12 and element 8 will respectively cause contacts 27 and 28 and contacts 9 and 10 to close again. This will complete the reverse rotation circuits in precisely the same manner as in Fig. 1 and the motor will rotate in the opposite direction. Completion of the winding circuits will have caused current to flow through line 5, and relay 38 will again have raised member 39 to open the dynamic breaking circuit. It will be seen that this embodiment has the same advantageous features as the embodiment of Fig. 1 and, in addition, is provided with a dynamic breaking circuit so that not only may the switch be moved instantaneously but the actual reversal of the motor will be extremely fast. Because of the rapidity of the sequency of events in the embodiment of Fig. 2 it is not as important as in Fig. 1 that member 12 be made to open and close at a lower speed than element 8. However in order to assure reversal of the motor, it is still deemed preferable to have the operation of member 12 and element 8 in the sequence described with respect to Fig. 1.

It will be readily apparent that this invention provides a circuit wherein the switching action may be instantaneous and reversal nonetheless insured; an extremely simple and economical type of switch may be used, and the absolute minimum of 3 external leads are all that are necessary.

While the friction device 11 and arm 12 are shown for providing direction-sensitive operation of contacts 20 and 21, and 27 and 28, it will be understood that any direction-sensitive device may be utilized such as that shown in Patent 2,598,440 to Donald C. Reek, issued May 27, 1952, and assigned to the assignee of the present application.

While we have shown and described particular embodiments of this invention, further modifications and improvements will occur to those skilled in the art. We desire it to be understood therefore, that this invention is not limited to the particular forms shown and we intend in the appended claims to cover all modifications which do not depart from the spirit and scope of this invention.

What we claim as new and desire to secure by Letters Patent of the United States is:

1. A reversible self-starting single phase alternating current motor comprising a pair of windings each having an end connected to a common terminal, phase displacing means connected across the other ends respectively of said windings, speed responsive disconnecting means in series with said phase displacing means, a pair of electrical lines connected respectively to said other ends of said windings, speed and direction responsive disconnecting means arranged in each of said lines, and means selectively connectable to one of said lines, said terminal and said selectively connectable means being adapted to be connected across a source of alternating current power whereby said windings will be energized through the selected one of said lines, said motor being rotatable in one direction when one of said lines is selected and being rotatable in the other direction when the other of said lines is selected, said speed and direction responsive means being arranged to disconnect the unselected line at a predetermined speed whereby said windings may not be energized through said unselected line until said motor slows down to said predetermined speed, said speed responsive means being arranged to disconnect said phase displacing means at a second predetermined speed thereby to disconnect that one of said windings having an end secured to said unselected line whereby said motor will continue to run on the one of said windings having an end connected to said selected line.

2. A reversible self-starting single phase alternating current motor comprising a pair of windings each having an end connected to a common terminal, phase displacing means connected across the other ends respectively of said windings, speed responsive disconnecting means in series with said phase displacing means, a pair of electrical lines connected respectively to said other ends of said windings, speed and direction responsive disconnecting means arranged in each of said lines, means selectively connectable to one of said lines, said terminal and said selectively connectable means being adapted to be connected across a source of alternating current power whereby said windings will be energized through the selected one of said lines, said motor being rotatable in one direction when one of said lines is selected and being rotatable in the other direction when the other of said lines is selected, said speed and direction responsive means being arranged to disconnect the unselected line at a predetermined speed whereby said windings may not be energized through said unselected line until said motor slows down to said predetermined speed, said speed responsive means being arranged to disconnect said phase displacing means at a second predetermined speed thereby to disconnect that one of said windings having an end secured to said unselected line whereby said motor will continue to run on the one of said windings having an end connected to said selected line, and means responsive to energization of both said windings arranged to form a closed circuit including said windings when the same are de-energized.

3. A reversible self-starting single phase alternating current motor comprising a pair of windings each having an end connected to a common terminal, a condenser connected across the other ends respectively of said windings, centrifugal means connected to said motor, a pair of contacts operable by said centrifugal means and in series with said condenser, a pair of electrical lines connected respectively to said other ends of said windings, speed and direction responsive means connected to said motor, second and third pairs of contacts respectively arranged in said lines and operable by said speed and direction responsive means, switch means selectively connectable to one of said lines, and relay means including a coil serially connected to said windings, and a fourth pair of contacts arranged to be disconnected upon de-energization of said relay coil, said fourth pair of contacts being arranged in parallel with said first pair of contacts, said terminal and said selectively connectable switch means being adapted to be connected across a source of alternating current power whereby said windings will be energized through the selected one of said lines, said motor being rotatable in one direction when one of said lines is selected and being rotatable in the other direction when the other of said lines is selected, said speed and direction responsive means being arranged to open that one of said second and third pairs of contacts which is in the unselected line at a predetermined speed whereby said windings may not be energized through said unselected line until said motor slows down to said predetermined speed, said speed responsive means being arranged to open said first pair of contacts at a second predetermined speed thereby to disconnect that one of said windings having an end secured to said unselected line whereby said motor will continue to run on the one of said windings having an end connected to said selected line, said relay means being operative to close said fourth pair of contacts when both of said lines are disconnected thereby to connect said windings together in a closed circuit.

4. A reversible self-starting single phase alternating current motor comprising a pair of windings each having an end connected to a common terminal, a condenser connected across the other ends respectively of said windings, centrifugal means connected to said motor, a first pair of contacts operable by said centrifugal means connected in series with said condenser, a pair of electrical lines connected respectively to said other ends of said windings, speed and direction responsive means connected to said motor, second and third pairs of contacts respectively arranged in each of said lines and operable by said speed and direction responsive means, and switch means selectively connectable to one of said lines, said terminal and said switch means being adapted to be connected across a source of alternating current power whereby said windings will be energized through the selected one of said lines, said motor being rotatable in one direction when one of said lines is selected and being rotatable in the other direction when the other of said lines is selected, said speed and direction responsive means being arranged to open that one of said second and third pairs of contacts which is in the unselected line at a predetermined speed whereby said windings may not be energized through said unselected line until said motor slows down to said predetermined speed, said speed responsive means being arranged to open said first pair of contacts at a second predetermined speed thereby to disconnect that one of said windings having an end secured to said unselected line whereby said motor will continue to run on the one of said windings having an end connected to said selected line.

References Cited in the file of this patent

UNITED STATES PATENTS

| | | |
|---|---|---|
| 2,285,687 | Snyder | June 9, 1942 |
| 2,580,242 | Reek | Dec. 25, 1951 |
| 2,661,451 | Tamm | Dec. 1, 1953 |